UNITED STATES PATENT OFFICE.

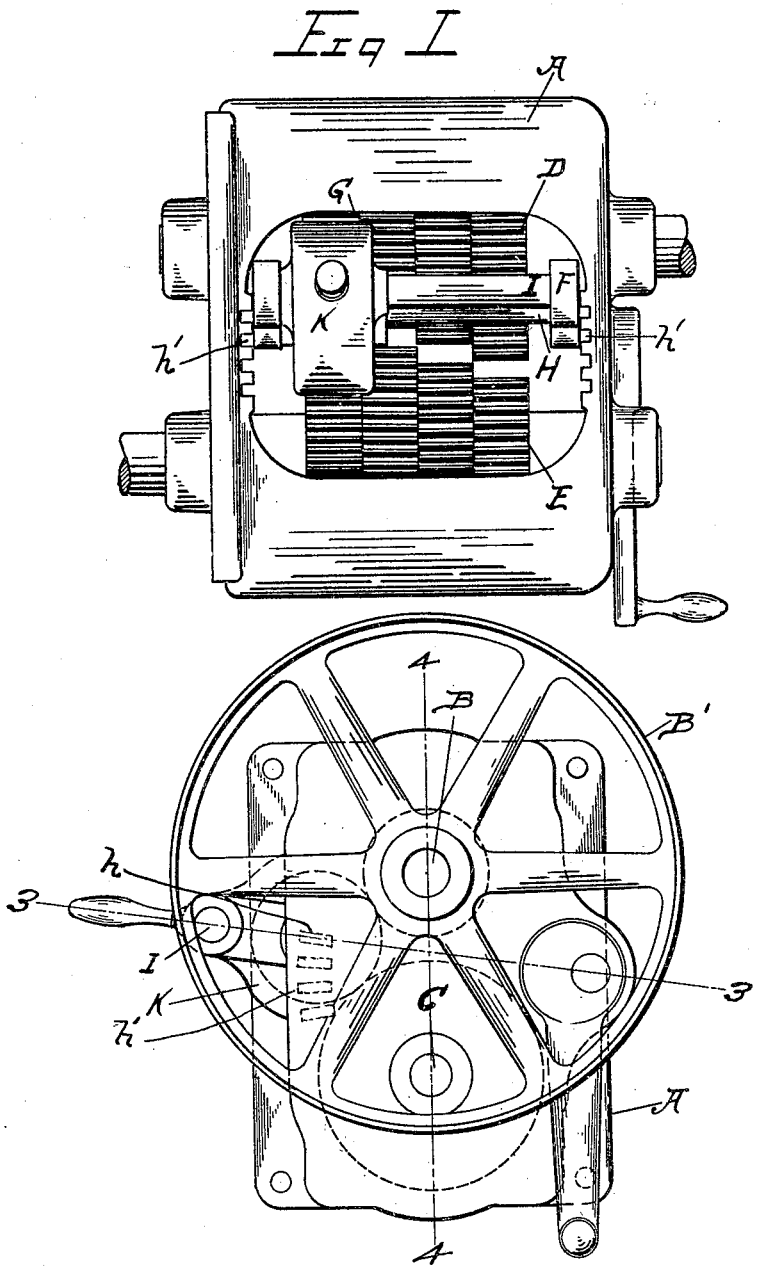

LARZ W. ANDERSON, OF CINCINNATI, OHIO, ASSIGNOR TO THE CINCINNATI SHAPER COMPANY, OF CINCINNATI, OHIO.

CHANGE-SPEED GEARING.

No. 807,104.     Specification of Letters Patent.     Patented Dec. 12, 1905.

Application filed June 17, 1904. Serial No. 212,978.

*To all whom it may concern:*

Be it known that I, LARZ W. ANDERSON, a citizen of the United States, and a resident of Cincinnati, in the county of Hamilton and State of Ohio, have invented a certain new and useful Improvement in Change-Speed Gearing, of which the following is a full, clear, and exact description, reference being had to the accompanying drawings, which form part of my specification.

My invention relates to a speed-changing device; and its object is to produce a simple and effective change-gear box which may be applied to any machine. Its advantages will appear as I proceed with my specification.

Figure 3:
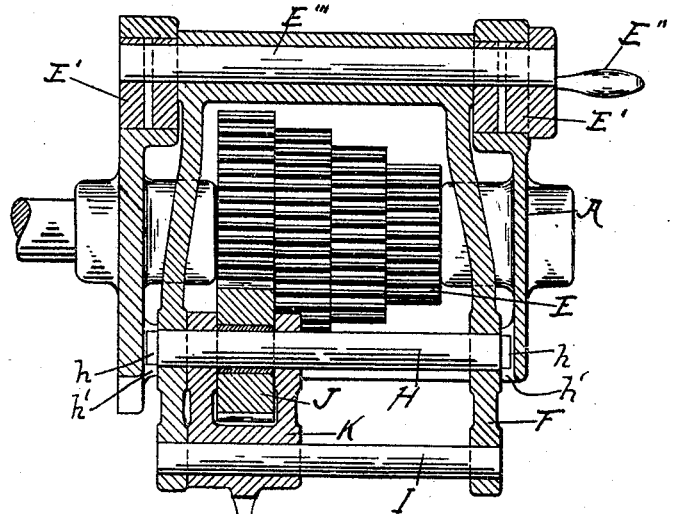
Figure 4:
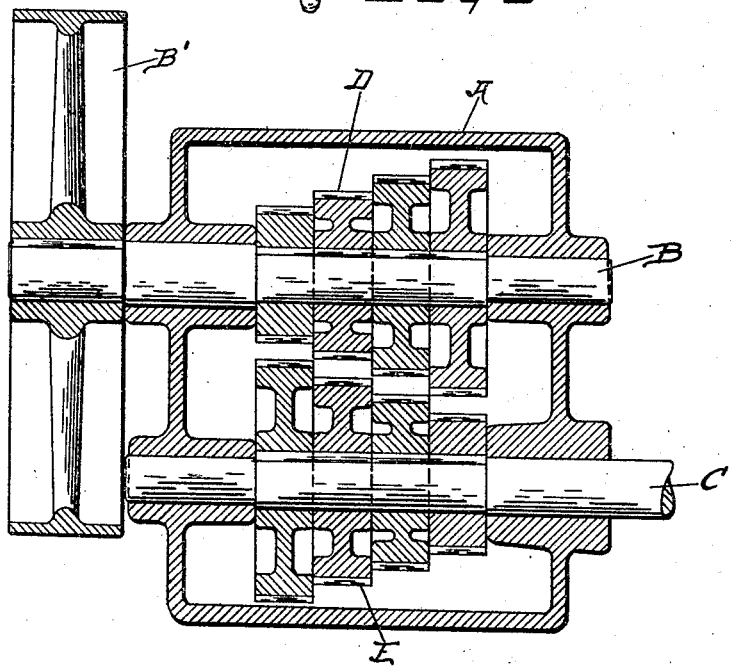

In the drawings, Figure 1 is a front elevation of my improved change-gear box. Fig. 2 is a side elevation of the same. Fig. 3 is a section of Fig. 2 on the line 3 3 thereof, and Fig. 4 is a section of Fig. 2 on the line 4 4 thereof.

A is the change-gear box, containing the speed-changing mechanism, and, as stated in the preamble, this box may be attached to any machine, its proper attachment depending simply on the relations of the driving and driven shafts in the particular machine.

B is the driving-shaft, which is operated in any manner—as, for example, by means of the pulley B'.

C is the driven shaft, which would determine the speed of the particular parts to be operated in the machine to which the change-gear box might be attached.

Keyed, respectively, to the shafts B and C are the cones of gears D and E, the two cones being reversed relatively to each other with the gears of corresponding inverse ratio placed opposite each other. A shaft E''' is eccentrically mounted in disks E' E', which are suitably journaled at the rear in the side walls of the change-gear box A. A frame F is journaled on the shaft E''' and projects forward between the shafts B and C through an opening G in the front face of the box A, its sides passing around the ends of the cones D and E. A shaft H and a rod I form the front of the frame F.

A sliding gear J is journaled on the shaft H. Said gear is embraced by a forked arm or bracket K, which slides on the shaft H, and the rod I, which is thus made rigid with reference to the frame F as to the direction in which it swings on the shaft, but readily movable in the direction of the shaft H. The arrangement of the parts is such that the intermediate gear is adapted to engage any pair of opposite gears composing the two cones.

A crank E'', secured to one of the disks E', serves by reason of the eccentric location of the shaft E''' in the disks E' to throw the frame F forward, which throws the intermediate gear out of engagement with any pair of the cone-gears with which it may have engaged. Then after swinging the frame F and moving the intermediate gear J opposite the pair of gears next desired to be put in train the movement of the crank E'' back into its normal position brings the intermediate gear into engagement with these gears.

The ends of the shaft H are prolonged at each side beyond the frame F and cut down to form rectangular lugs $h\ h$. At each side of the opening G in the gear-box A are cut a number of notches $h'$, adapted to receive the lugs $h$, there being a pair of opposite notches $h'$ for each pair of oppositely-placed cone-gears. These notches and lugs serve to lock the frame in position, so as to prevent any swinging movement. At the same time the shaft E''' is so mounted in the disks E' that the frame is on a "dead-center" and fixed as to its forward and back movement when the intermediate gear is in engagement with any pair of the cone-gears. The intermediate gear J is thus locked against either up and down movement, due to the swinging of the frame F on the shaft E''', or against horizontal movement permitted by the eccentric mounting of said shaft when the intermediate gear is in operative position.

The operation of my improvement is apparent from this description. Of course any number of different speeds may be induced in the driven shaft C, depending upon the number of gears in the two cones D and E.

I do not wish to be limited to the particular construction described and shown, as it is apparent that it may be varied without departing from the spirit of my invention; but What I desire to claim as new and to cover by Letters Patent is—

1. A change-gear device comprising a driving-shaft, a driven shaft, similar reversed cones of gears keyed to each shaft, a shaft eccentrically journaled with means for rotating it, a frame journaled on said shaft, an intermediate gear carried by said frame and sliding on said frame in a direction parallel to the axes of said cones of gears, said intermediate gear being adapted to engage any two of the opposite gears of said cones, and means for locking said frame in position, substantially as described.

2. A change-gear device comprising a driving-shaft, a driven shaft, oppositely-disposed reversed cones of gears keyed to each shaft, a vibratory frame, a shaft on which said frame is journaled, rotatable disks in which said shaft is eccentrically mounted, means for rotating said disks, an intermediate gear sliding on said frame in a direction parallel to the axes of said cones and adapted to engage any pair of the oppositely-disposed gears, and means for locking said frame in position, substantially as described.

3. A change-gear device comprising a box open in front, a driving and driven shaft journaled therein, oppositely-disposed reversed cones of gears keyed to each shaft, a vibratory frame, a shaft on which said frame is journaled, rotatable disks journaled in the sides of the box, said shaft being eccentrically mounted in said disks, a crank secured to one of said disks, an intermediate gear sliding on said frame in a direction parallel to the axes of said cones of gears and adapted to engage any pair of the oppositely-disposed gears, notches in the sides of the opening in said gear-box corresponding to the number of pairs of oppositely-disposed gears, and lugs at the sides of said frame adapted to engage said notches, substantially as described.

LARZ W. ANDERSON.

Witnesses:
   CLARENCE E. MEHLHOPE,
   GEORGE HEIDMAN.